US010882247B2

(12) United States Patent
Van Esbroeck et al.

(10) Patent No.: US 10,882,247 B2
(45) Date of Patent: Jan. 5, 2021

(54) ADDITIVE MANUFACTURING DEVICE WITH RELEASE MECHANISM

(71) Applicant: STRUCTO PTE LTD, Singapore (SG)

(72) Inventors: Hubertus Theodorus Petrus Van Esbroeck, Singapore (SG); Teck Wee Tan, Singapore (SG); Devansh Sharma, Singapore (SG); Siu Hon Lam, Singapore (SG); Kah Fai Chin, Singapore (SG)

(73) Assignee: STRUCTO PTE LTD, Singapore (SG)

( * ) Notice: Subject to any disclaimer, the term of this patent is extended or adjusted under 35 U.S.C. 154(b) by 150 days.

(21) Appl. No.: 15/546,321

(22) PCT Filed: Jan. 27, 2016

(86) PCT No.: PCT/SG2016/050039
§ 371 (c)(1),
(2) Date: Jul. 26, 2017

(87) PCT Pub. No.: WO2016/122408
PCT Pub. Date: Aug. 4, 2016

(65) Prior Publication Data
US 2018/0029296 A1      Feb. 1, 2018

(30) Foreign Application Priority Data

Jan. 28, 2015   (GB) .................................. 1501382.4

(51) Int. Cl.
*B29C 64/264*    (2017.01)
*B29C 64/129*    (2017.01)
(Continued)

(52) U.S. Cl.
CPC .......... *B29C 64/129* (2017.08); *B29C 64/135* (2017.08); *B29C 64/255* (2017.08);
(Continued)

(58) Field of Classification Search
CPC ..... B29C 64/20; B29C 64/223; B29C 64/255; B29C 64/259; B29C 64/286; B29C 64/129; B33Y 10/00; B33Y 30/00
See application file for complete search history.

(56) References Cited

U.S. PATENT DOCUMENTS 3,861,955 A      1/1975   Lemelson
5,158,858 A  *  10/1992   Lawton ................. B29C 64/135
                                                              264/401
(Continued)

FOREIGN PATENT DOCUMENTS

DE     102012011610 A1    11/2012
JP         H0224124 A      1/1990
(Continued)

OTHER PUBLICATIONS

Renner, Joachim. Nov. 29, 2012, Machine Translation for DE 102012011610 A1 of Record (Year: 2012).*

*Primary Examiner* — Timothy Kennedy
*Assistant Examiner* — Alexander A Wang
(74) *Attorney, Agent, or Firm* — Standley Law Group LLP; Stephen L. Grant

(57) ABSTRACT

An additive manufacturing device has a vessel for containing a polymerizable material, a build platform and a curing unit. The vessel has a flexible wall which is at least partially transparent to radiation at one or more wavelengths at which the material is polymerizable. The build platform is movable relative to the vessel to position a build surface thereof to face the flexible wall. The curing unit has a rigid component with a planar contact surface, the rigid component being at least partially transparent to radiation at the one or more curing wavelengths, and a radiation module positioned to emit radiation through the rigid component. The rigid component and the vessel are movable relative to each other. In a first position, the planar contact surface of the rigid
(Continued)

component is in contact with the flexible wall, and in a second position, the rigid component is separated therefrom.

11 Claims, 13 Drawing Sheets

(51) Int. Cl.
    *B33Y 10/00* (2015.01)
    *B33Y 30/00* (2015.01)
    *B29C 64/286* (2017.01)
    *B29C 64/255* (2017.01)
    *B29C 64/135* (2017.01)
    *B29C 64/223* (2017.01)
    *B29C 64/232* (2017.01)
(52) U.S. Cl.
    CPC .......... *B29C 64/286* (2017.08); *B33Y 10/00* (2014.12); *B33Y 30/00* (2014.12); *B29C 64/223* (2017.08); *B29C 64/232* (2017.08); *B29C 64/264* (2017.08)

(56) References Cited

U.S. PATENT DOCUMENTS

| | | | |
|---|---|---|---|
| 5,529,473 A | 6/1996 | Lawton et al. | |
| 7,845,930 B2 | 12/2010 | Shkolnik et al. | |
| 8,877,115 B2 | 11/2014 | Elsey | |
| 8,915,620 B2 | 12/2014 | Vaes et al. | |
| 9,464,025 B2 | 10/2016 | Essayem et al. | |
| 2002/0153640 A1 | 10/2002 | John | |
| 2010/0125356 A1* | 5/2010 | Shkolnik | G06T 1/00 700/98 |
| 2013/0078325 A1* | 3/2013 | Sperry | B29C 64/106 425/169 |
| 2014/0167326 A1* | 6/2014 | Jones | G03G 15/1645 264/427 |
| 2014/0191442 A1 | 7/2014 | Elsey | |
| 2016/0114565 A1* | 4/2016 | Qian | B32B 37/003 428/138 |
| 2017/0305136 A1* | 10/2017 | Elsey | B29C 64/20 |

FOREIGN PATENT DOCUMENTS

| | | |
|---|---|---|
| JP | H0224125 A | 1/1990 |
| JP | 04156325 A | 5/1992 |
| JP | 06246838 A | 9/1994 |

* cited by examiner

ADDITIVE MANUFACTURING DEVICE WITH RELEASE MECHANISM

TECHNICAL FIELD

The disclosed embodiments relate to a device and a method for using the device to perform additive manufacturing by using radiation to polymerize a curable monomer. The additive manufacturing device has a vessel that contains the monomer, a build platform having a build surface and a curing unit that supplies the radiation for curing the monomer.

BACKGROUND

Additive manufacturing is the process of forming three dimensional objects by adding material, effectively building up an object, as opposed to traditional subtractive methods such as carving or CNC machining, in which a three dimensional object is formed by removing material from a larger piece. In most apparatuses and methods for additive manufacturing the three dimensional object is built up layer by layer in a vertical direction. The desired three dimensional object is formed out of a stack of very thin layers of material, each such layer being the representation of the object's cross-section at the vertical position of that layer within the object.

In one known type of additive manufacturing a photosensitive resin is used to form the three dimensional object. The resin is a liquid monomer which can be made to polymerize, or cure, when exposed to radiation of a particular wavelength, for example ultraviolet light. For example, in selective deposition machines, the resin can be deposited in liquid form in a desired pattern and then cured to form one cross sectional layer of the three dimensional object. Alternatively, in selective curing machines, a bulk amount of resin is selectively exposed to radiation of the appropriate wavelength so that it cures only where desired. Examples of machines which use such a selective curing method are stereolithography (SLA) and digital light processing (DLP) machines.

In an additive manufacturing machine which uses a photosensitive resin it can be difficult to maintain a uniform layer thickness throughout the three dimensional object. This is because the rheological properties of the liquid resin dictate its ability to flow onto or spread out across a surface. For example, a liquid resin having a specific viscosity will have a practical limit as to how thin it will spread on its own. A resin with a very high viscosity will tend not to spread as thinly as a less viscous liquid (such as water) across the solid metal or plastic surface of a build platform. In addition, properties like density and viscosity are not constant with temperature, such that operating an additive manufacturing machine under non-standard or variable conditions may also compromise the fidelity of the printed object.

Some additive manufacturing devices, such as the Formlabs Form1 printer, have a resin vat with a transparent lower wall through which the layers of the printed object are cured. A build platform can be made to move vertically up- and downward within and above the vat. To print the first layer, the build platform moves to a position such that its lower build surface is a distance equivalent to one layer thickness away from the transparent lower wall. A thin layer of resin sandwiched between the build surface (of the build platform) and the curing surface (of the transparent lower wall) is exposed to radiation from below through the transparent lower wall. After curing the first layer, the build platform moves upward (away from the bottom of the vat). The cured first layer adheres more strongly to the build surface of the build platform than to the curing surface of the transparent lower wall, so that when the build platform is moved upward, the cured first layer moves with it and a void is created for resin to flow into such that the next layer can be formed. Repeating this process builds up a three dimensional object layer by layer, in an upside-down manner as the build platform moves upward and out of the vat. The transparent lower wall is substantially rigid, such that successive layers can be formed consistently and with the respective desired layer thicknesses. The layer thickness may be controlled (e.g., kept constant or adjusted to provide lower or higher resolution) by providing precise computer control of the positions of the build platform and the curing panel.

The main drawback of the above-described print mechanism is the need to overcome adhesion of the cured resin to the transparent lower wall. To ensure smooth printing, it is critical that cured polymer resin adheres significantly more strongly to both the material of the build surface and previously cured resin layers than to the material of the transparent lower wall.

In order to address the adhesion issue, most consumer-grade 3D printers use a cure-inhibiting coating such as PDMS on the curing surface, a tilting separation mechanism (which promotes gradual separation of the cured material from the curing surface), or both. However, each of these has its own drawbacks. For example, oxygenated cure-inhibiting coatings such as PDMS only have a finite amount of dissolved oxygen in a given application, and must therefore be replaced periodically in order to continue to be effective. In addition, such coatings are typically flexible and elastic. This may result in reduced fidelity of printed three dimensional objects, and the coating may also be prone to tearing.

Another drawback of the above print mechanism, due to the adhesion problem, is that scaling to industrial-grade printing is highly problematic. The force required to separate a cured layer of resin from the curing surface scales disproportionately with size. A machine capable of printing an object twice as big will require significantly more than twice the applied force to separate cured layers off of the curing surface. This makes the tilting separation mechanism impractical to implement in an industrial scale 3D printer. In other words, at industrial scale neither a cure-inhibiting coating nor a tilt separation mechanism are feasible solutions to the adhesion problem.

For the above reasons, presently known high-end industrial 3D printers utilize more complex systems for spreading a thin layer of resin and controlling its thickness before and until exposure to radiation. For example, in one known machine, the build platform moves downwardly in the vessel to allow resin to flow over a previously cured layer. Next, the build platform is moved upwardly again so that it is at the level appropriate for the desired layer thickness. Due to the surface tension of the resin, the amount of resin on the top of the build surface is thicker than desirable, such that a swiping element such as a rigid bar or plate must be swept across the top surface of the liquid to level it prior to curing. This mechanism adds cost, time and complexity to the printing process. In particular, detailed computation of the fluid's properties is required in order to predict how quickly after swiping that the fluid's surface tension will again cause it to form an undesirably thick layer. The swiping mechanism can also only produce consistent results in a well-controlled environment, e.g. at standard temperature.

The present invention seeks to overcome one or more of the above disadvantages, or at least to provide a useful alternative.

SUMMARY

In one aspect, the present invention provides an additive manufacturing device, comprising:
- a vessel for containing a material which is polymerisable at one or more curing wavelengths, the vessel having a flexible wall which is at least partially transparent to radiation at the one or more curing wavelengths;
- a build platform having a build surface, the build platform being movable relative to the vessel to position the build surface such that the build surface faces the flexible wall; and
- a curing unit comprising a rigid component having a planar contact surface, the rigid component being at least partially transparent to radiation at the one or more curing wavelengths, and a radiation module positioned or positionable relative to the rigid component to emit radiation therethrough;
- wherein the rigid component and the vessel are movable relative to each other, such that in a first position, the planar contact surface of the rigid component is in contact with the flexible wall, and in a second position, the rigid component is separated from the flexible wall.

Advantageously, by allowing the rigid component to move relative to the flexible wall, it is possible for the planar contact surface of the rigid component to provide a temporary support while polymerisable material contacting the flexible wall is cured by the radiation module. This ensures consistent formation of planar layers of cured material. Subsequent to the curing process, relative movement between the rigid component and the vessel allows formation of an air gap between the rigid component and the flexible wall, thus enabling much easier separation of the cured material from the flexible wall.

Preferably, the flexible wall is elastic.

In certain embodiments, the rigid component is fixed with respect to the radiation module.

In certain embodiments, the radiation module comprises an electronically addressable array of radiation emitting or transmitting elements, the array being configurable to produce radiation having a predetermined pattern by selective activation of elements of the array. The radiation module may comprise a dynamic mask component, such as an LCD (and preferably a monochrome LCD) containing the electronically addressable array, and a radiation source for irradiating through the dynamic mask component. The rigid component may be, or may comprise, the dynamic mask component.

In other embodiments, the radiation module may comprise a projector which is configurable to produce radiation having a predetermined pattern, optionally accompanied by suitable optics for directing the radiation through the rigid component.

In further embodiments, the radiation module comprises an LED array or OLED array. The rigid component may be, or may comprise, the LED array or OLED array.

In certain embodiments, the flexible wall is a membrane. It may comprise a fluoropolymer and/or an elastomer.

In some embodiments, the rigid component is an outer layer of the curing unit, such as a transparent or translucent panel.

In certain embodiments, the curing unit comprises a housing with a rounded edge. This allows the curing unit to depress the flexible wall to tension it, without puncturing or otherwise damaging the flexible wall.

In another aspect the present invention provides an additive manufacturing method, comprising:
- providing a vessel having a flexible wall which is at least partially transparent to radiation at one or more curing wavelengths of radiation;
- at least partially filling the vessel with a material which is polymerisable at the one or more curing wavelengths;
- positioning a build surface of a build platform within the vessel such that the build surface faces the flexible wall; and
- positioning a curing unit relative to the flexible wall, the curing unit comprising a radiation module, such that a planar contact surface of a rigid component of the curing unit contacts the flexible wall, the rigid component being at least partially transparent to radiation at the one or more curing wavelengths.

The method may further comprise curing a layer of the material adjacent the build surface by irradiating the material through the rigid component and the flexible wall. Subsequent to curing the layer, the curing unit may be moved such that the rigid component is separated from the flexible wall. The build platform may be moved such that the build surface moves away from the flexible wall, thereby separating the cured layer from the flexible wall.

BRIEF DESCRIPTION OF THE DRAWINGS

Embodiments of the invention will now be described, by way of non-limiting example only, with reference to the accompanying drawings in which.

DETAILED DESCRIPTION OF EMBODIMENTS

Figure 1:
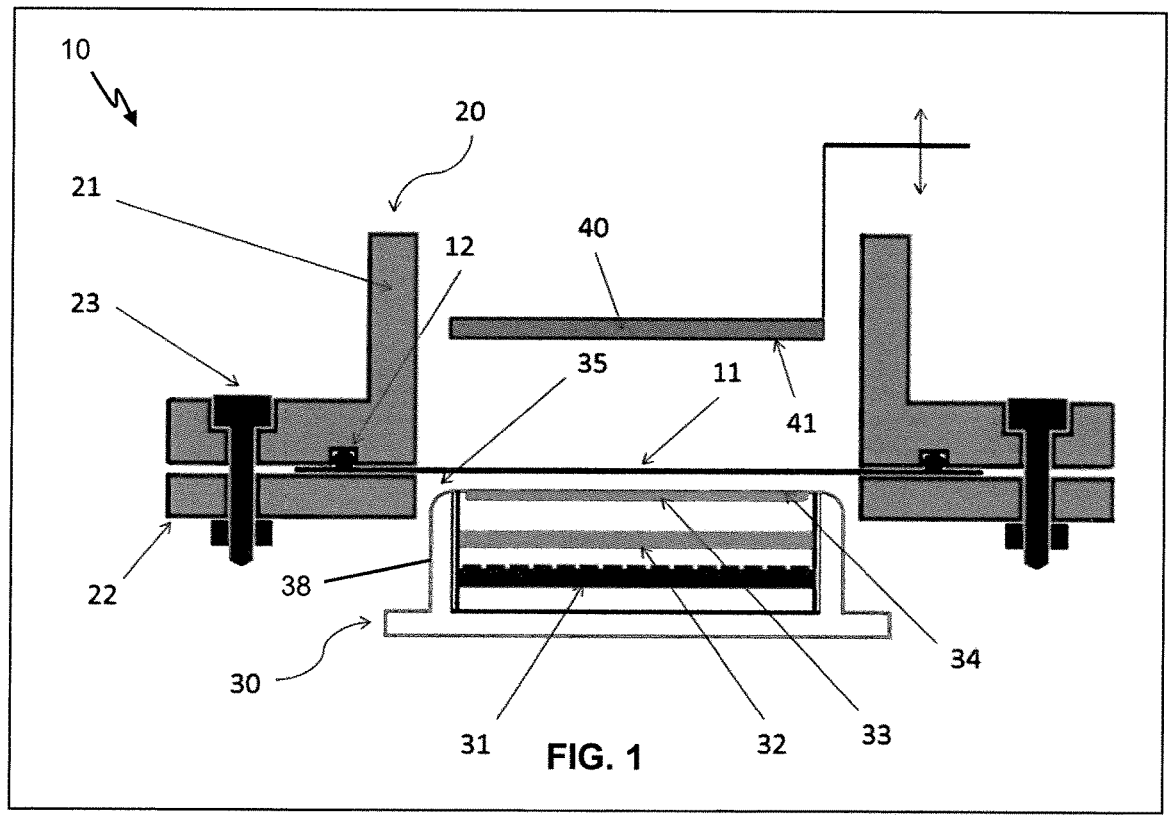
FIG. 1 shows, in highly schematic form, a first embodiment of an additive manufacturing device.

Referring initially to FIG. 1, there is shown, in highly schematic form, an embodiment of an additive manufacturing device 10 comprising a vessel 20 for containing a material which is polymerisable at one or more curing wavelengths of radiation. The material may be, for example, a polymerisable resin, adhesive, monomer, oligomer, prepolymer, a colloidal suspension, etc. The device 10 also comprises a build platform 40, which is coupled to a drive mechanism (not shown) for moving the build platform 40 towards and away from a wall 11 of the vessel 20. In the embodiment illustrated in FIG. 1, the wall 11 is a lower wall of the vessel 20 and the build platform 40 is lowered (i.e. moved towards) or raised (i.e. moved away) with respect to the lower wall 11.

The build platform 40 has a build surface 41 on which layers of a 3D object are progressively added, as will be described in more detail below.

Figure 2:
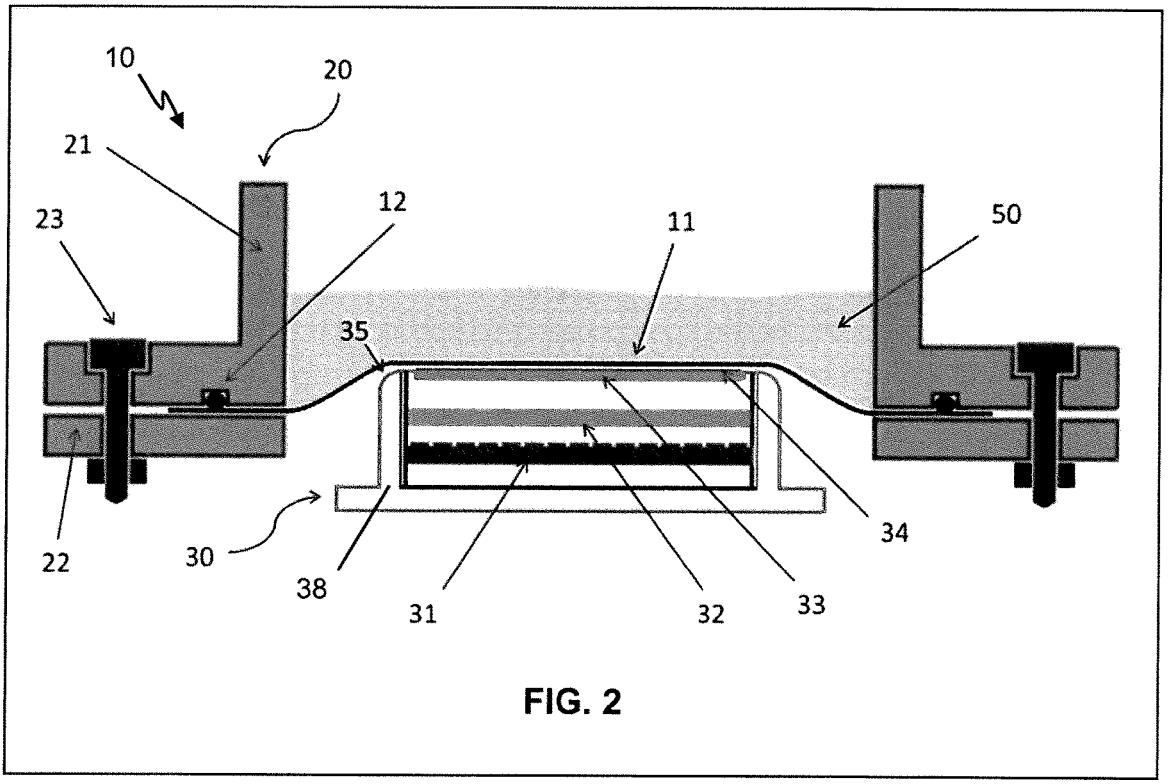
FIGS. 2 to 8 show the additive manufacturing device of FIG. 1 in various states during an additive manufacturing process.

The additive manufacturing device 10 also comprises a curing unit 30 which is configured to emit radiation at the one or more curing wavelengths, through the lower wall 11 and into the volume of vessel 20, in order to selectively cure portions of the polymerisable material 50 in the vessel 20 (FIG. 2). To this end, the lower wall 11 is at least partially transparent (e.g., fully transparent or translucent) to the radiation emitted by the curing unit 30. For example, if the radiation source of curing unit 30 is a UV radiation source, then the lower wall 11 is at least partially, and preferably completely, transparent to UV radiation, or at least to wavelengths which correspond to one or more peaks of the emission spectrum of the radiation source.

In particular, the lower wall 11 is formed from a flexible and preferably elastic material, and may be a flexible membrane formed from a fluoropolymer and/or elastomer having suitable optical properties, such as a fluorinated ethylene propylene (FEP) film. Advantageously, as well as being optically clear, FEP is also high strength and chemically resistant.

The flexible membrane 11 is affixed between upper portions 21 and lower portions 22 of the vessel 20 which are held together by screws or other suitable fasteners 23. The upper portions may contain one or more recesses to receive a sealing member such as a gasket 12 which is clamped against the surface of flexible membrane 11. The sealing member 12 may be of a material that is chemically resistant so as to prevent its degradation upon contact with the polymer resin 50 which may be contained in the vat 20. Together, the upper portions 21, lower portions 22, screws 23, gasket 12 and flexible membrane 11 provide a liquid-tight seal to prevent egress of liquid resin 50 from the vessel 20. The flexible membrane 11 may be, but is not necessarily, stretched across the vessel 20 such that it is tensioned and substantially planar.

The curing unit 30 comprises a housing 38 within which is housed a radiation source 31, a dynamic mask in the form of a liquid crystal display (LCD) 32, and a substantially rigid component in the form of a curing panel 33 having an outer surface 34 facing away from the housing 38. The curing panel 33 is at least partially transparent to the radiation emitted by the radiation source 31, such that the radiation can be transmitted through the curing panel 33 and also through the flexible membrane 11 to cure the polymerisable material 50.

Figure 4:
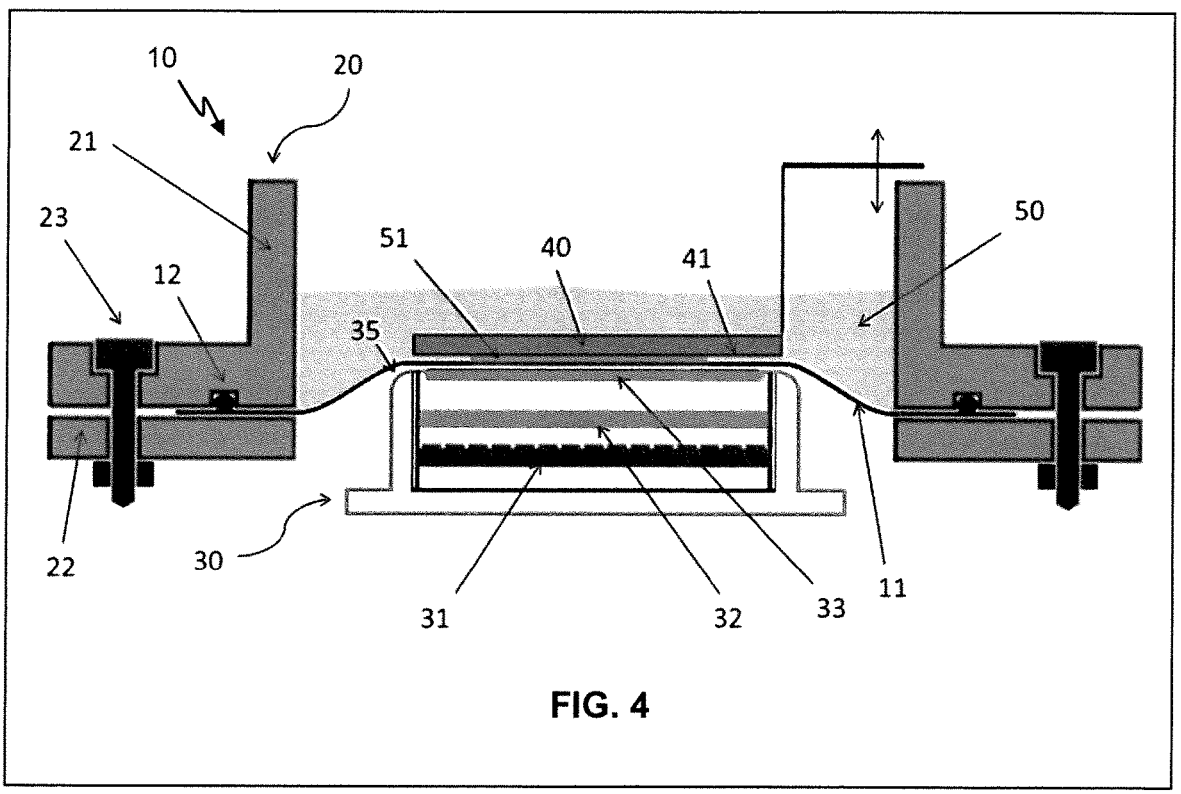
Figure 5:
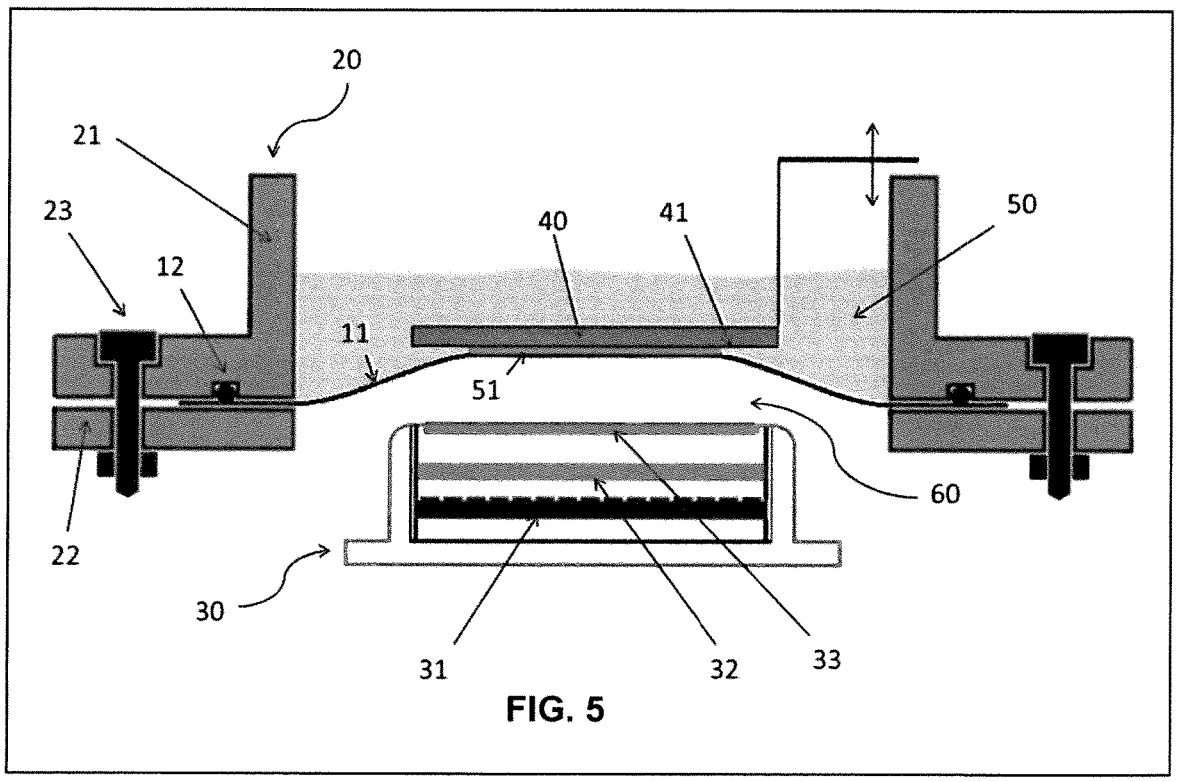
Figure 6:
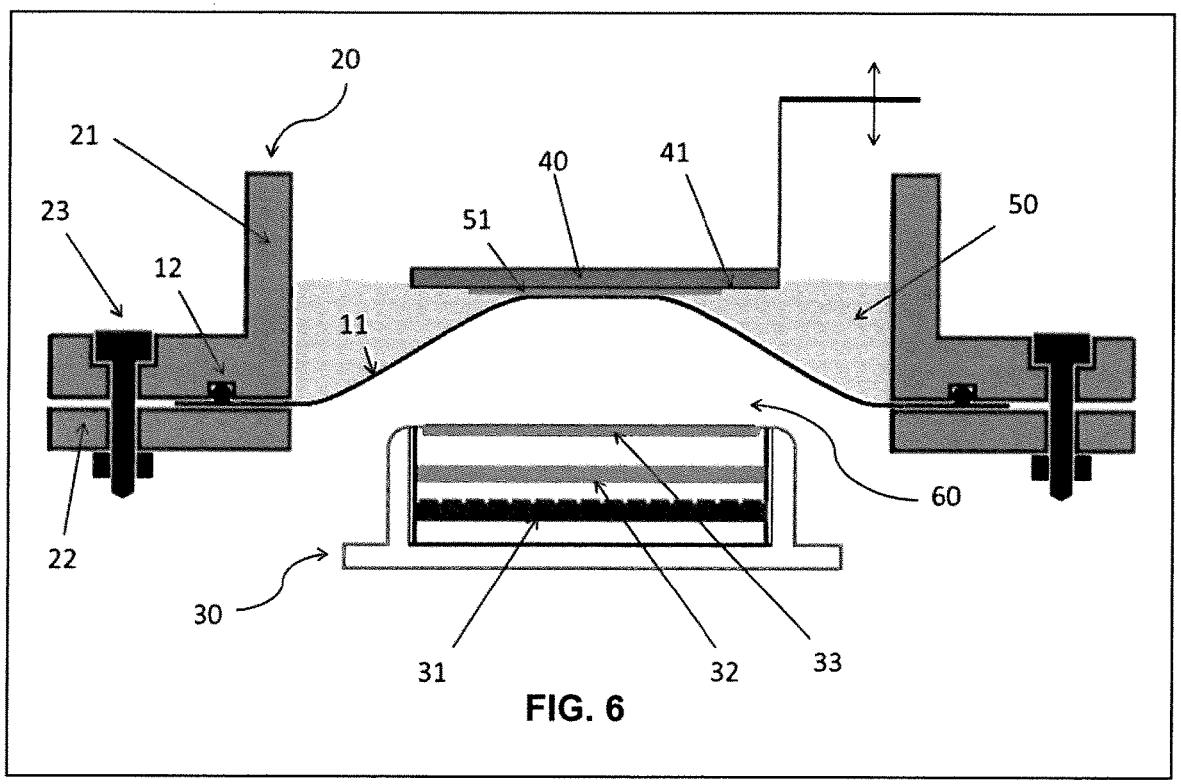

The curing unit 30 comprises a drive mechanism (not shown) which is actuatable to move the curing unit 30 towards or away from the flexible wall 11. The curing unit 30 may be moved to a position such that the outer surface 34 of the curing panel 33 contacts the flexible membrane 11, or presses against it so as to apply tension such that the membrane 11 is smooth and taut across the rigid surface 34 of the curing panel 33 (the housing 38 may have rounded edges 35 in order to ensure that the curing unit 30 does not puncture the membrane 11). In this position, the rigid curing panel 33 supports the weight of the resin in the vessel 20, so as to prevent the membrane 11 sagging and to provide a planar platform for formation of a cured layer 51 of resin, as shown in FIG. 4. Because the membrane 11 is flexible it is possible to separate the cured layer 51 of resin from the membrane 11 by moving the build platform 40 away from the membrane 11, as shown in FIG. 5 and FIG. 6.

Advantageously, by allowing the rigid curing panel 33 to move relative to the flexible membrane 11, it is possible for the contact surface 34 of the curing panel 33 to provide a temporary support during the curing process to ensure consistent formation of planar layers of cured material, whilst subsequently allowing formation of an air gap 60 (FIG. 5) when the curing panel 33 is moved away from the flexible membrane 11 post-curing. This air gap allows much easier separation of the cured layer 51 from the membrane 11 than if the curing panel 33 were to remain in contact with the membrane 11.

As used herein, the term "elastic", in relation to a membrane, means that the membrane is capable of being deformed from an initial conformation to a degree required to accommodate the surface of the curing unit 30 such that a substantially planar contact is made with the surface (or part thereof) of the curing unit, but returns substantially to the initial conformation once the deforming force is no longer being applied.

In addition to FEP, two further examples of suitable flexible and elastic membranes are PTFE Teflon and transparent latex.

In testing of an embodiment of the present invention, a PTFE Teflon membrane having a thickness of 100 microns was used. Although PTFE Teflon is not very transparent, it was sufficiently translucent to transmit radiation from a standard UV LED light source to enable curing of resin in the vessel 20. PTFE Teflon has high chemical resistance, making it durable for thousands of printing cycles.

In testing of another embodiment, a transparent latex membrane having a thickness of 250 microns was used. Transparent latex has extremely good elasticity and elastic durability (it will stretch and return to its original configuration thousands of times without permanent deformation), so that it may be tensioned across a surface easily. The high elasticity also means that it can stretch further along with the build platform 40, i.e. deeper into the vessel 20, while gradually releasing the cured layer 51 with a radially inward peeling motion. This more gradual release indicates that the separation force at any point is lower than when using a less elastic membrane (such as PTFE or FEP), thus allowing more delicate features to be printed. Latex sheeting suitable for use in embodiments of the present invention is manufactured by Professional Plastics Inc. of Fullerton, Calif. and sold under the trade mark HYTONE.

Figure 17:
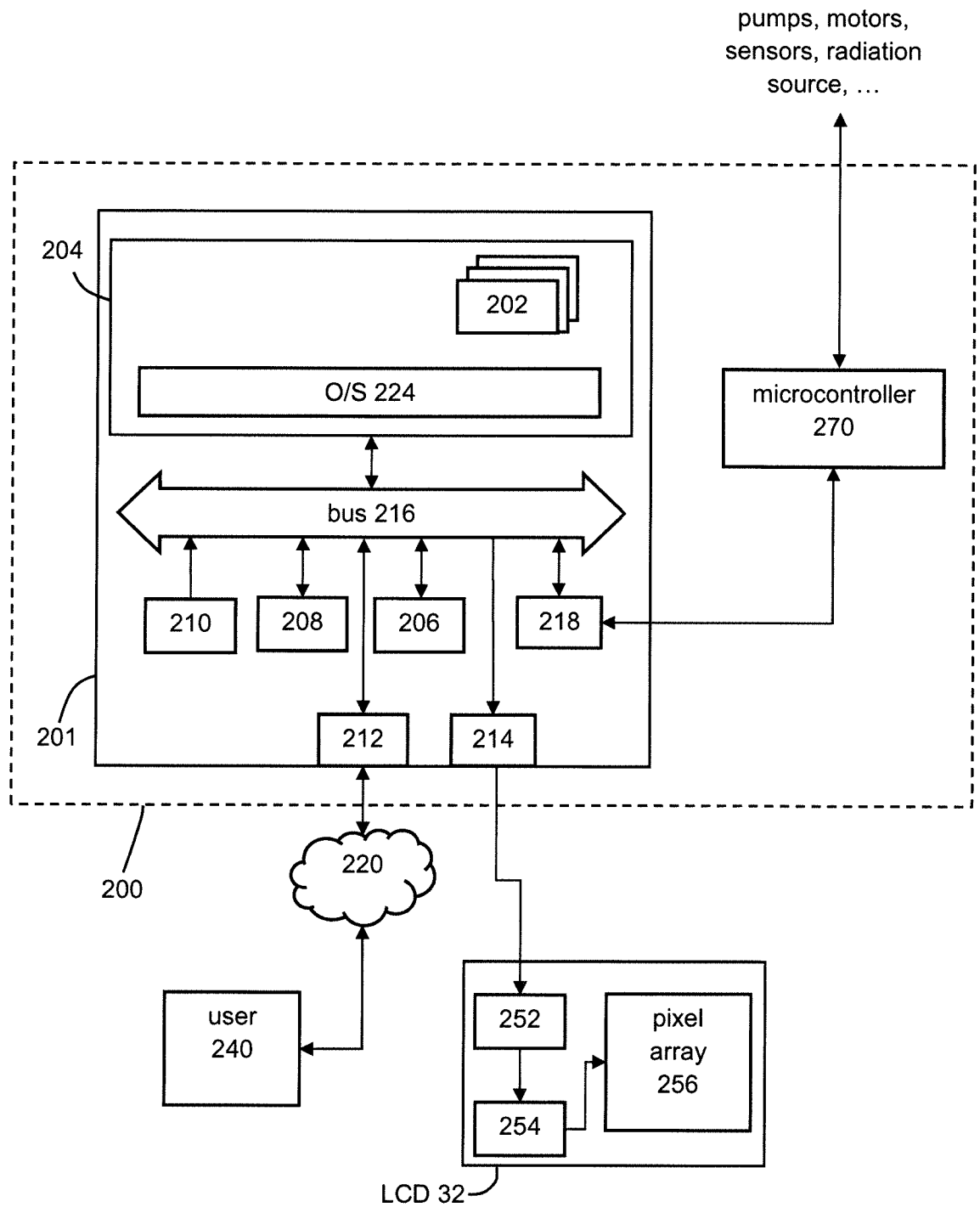
FIG. 17 is a block diagram of an exemplary control system for the additive manufacturing devices of FIGS. 1 and 11.

The LCD 32 and radiation source 31 form part of a programmable radiation module which can be configured to produce a patterned beam of radiation to cure a layer of resin in the vessel 20 with a desired pattern. The pixels of LCD 32 constitute individually addressable elements which may be switched on or off by a control system 200 of the device 10, which is coupled to the LCD 32 (as shown in FIG. 17). When a pixel is activated (switched on), it allows light to be transmitted through it, whereas when it is inactive (switched off), it blocks light. Accordingly, the pixels of LCD 32 are individually addressable light transmitters which can be programmed by the control system 200 to produce the desired pattern of radiation, with the inactive pixels acting as masking elements.

The LCD 32 is preferably a monochrome LCD. In a colour LCD, each pixel is made up of three or four individually addressable sub-pixels, each having a colour filter that allows light in a narrow wavelength band to pass through it. The panchromatic white backlight in a colour LCD emits all wavelengths between 400-700 nm, and colour is created by selectively allowing this white light to pass through the red, green and blue (R,G,B) filtered sub-pixels. For printing applications, light in the ultraviolet (UV) or true violet (TV) range is most effective, as each photon carries a relatively large amount of energy. The wavelength for these photons ranges from approx 300-450 nm. All of the sub-pixel filters (R, G, and B) in a colour LCD prevent light of such wavelengths from passing through it, i.e. the intensity of effective photons transmitted through a normal LCD is minimal. For this reason, the use of a monochrome LCD, which does not have any colour filters, has been found to give much shorter curing time (more photons transmitted).

In some embodiments, the radiation module may comprise a panel of individually addressable light emitters in an array, such as an LED or OLED display. In similar fashion to the LCD 32, the panel can be programmed by the controller such that selected light emitters are active at any given time, in order to produce the desired pattern of radiation. In these embodiments, the individually addressable elements of the radiation module themselves emit the radiation in the desired curing pattern, rather than acting as a mask for a separate radiation source. LEDs and Organic LEDs can in principle be designed to emit any particular wavelength of light (visible, UV, IR) to match the specific curing requirement of the polymerisable fluid 50. In these embodiments, the additive manufacturing device could be made more compact as no "backlight" as such is required when the display panel itself is the light (radiation) source, and the need for an optical assembly between the separate light source and LCD is also eliminated.

In some embodiments, the curing panel 33 may be separate from the LCD 32 and radiation source 31. For example, the curing panel 33 may be movable independently of the remainder of the curing unit 30 in order to contact the membrane 11, with the radiation source 31 and LCD 32 then being activated to emit radiation of the desired layer pattern through the curing panel 33 while it is in place. The radiation source 31 and LCD 32 may be in fixed position or may also be independently movable. In other embodiments, the curing panel 33 and LCD 32 may be fixed relative to each other, and may move independently of the radiation source 31.

In yet further embodiments the curing panel 33 may be omitted altogether, such that the LCD (or other masking component) 32 itself acts as the rigid component which contacts the membrane 11. This is possible if the masking component 32 itself is sufficiently rigid to serve as both a masking component as well as a rigid curing panel. The advantage of this embodiment is that the masking component 32 is separated from the photosensitive resin 50 only by membrane 11 which may be very thin. If membrane 11 is very thin, for example less than 50 micrometers thick, radiation striking the layer of photosensitive resin 50 very closely represents the pattern of radiation passed through masking component 32, as the distance through which the radiation may diverge after passing through the masking component is very small, equal to the thickness of membrane 11.

Figure 10:
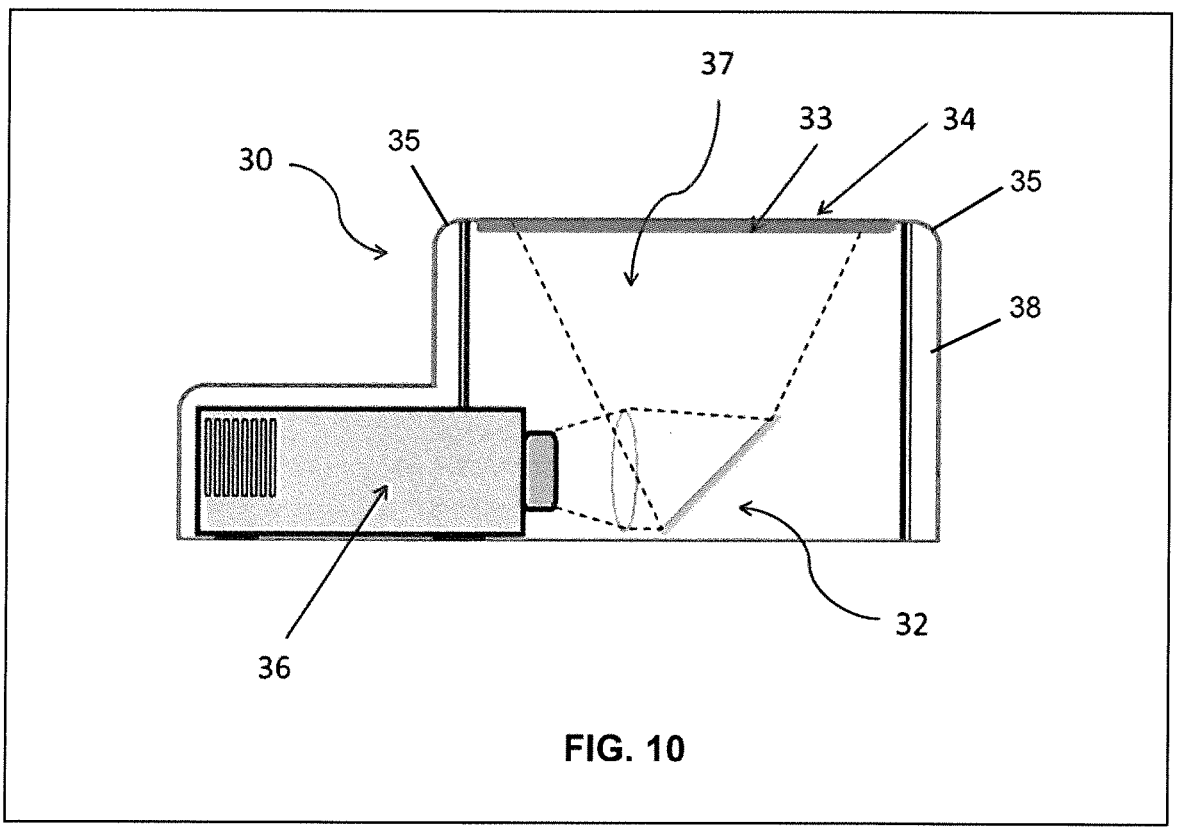
FIG. 10 shows an alternative curing unit usable with the additive manufacturing device of FIG. 1.

Radiation source 31 may be a point emitter such as a bulb or LED light or a panel having an array of such point emitters. It may also be a laser emitter. In some embodiments, as shown in FIG. 10, the radiation source may be an image projector 36 such as a Digital Light Processing (DLP) projector which may also have an internal optical assembly in addition to being the source of radiation. A Digital Light Processing projector for example has various embedded optical lenses as well as a Digital Micromirror Device (DMD). As will be appreciated by the skilled person, if the radiation source 31 is a laser emitter or comprises a DLP or other type of projector, a masking component such as LCD 32 is not required since the image of the desired layer pattern can be projected directly onto the resin without the need for masking.

In the embodiment of the curing unit 30 shown in FIG. 10, in addition to the radiation source 31 and rigid curing panel 34, the curing unit 30 may also comprise an optical assembly 32, which may have one or multiple lenses and mirrors or any combination of these, via which patterned radiation from the radiation source 31 may travel in a beam path 37 and out through the curing panel 33.

Operation of the additive manufacturing device 10 during a build of a 3D object will now be described with reference to FIGS. 3 to 8.

Figure 3:
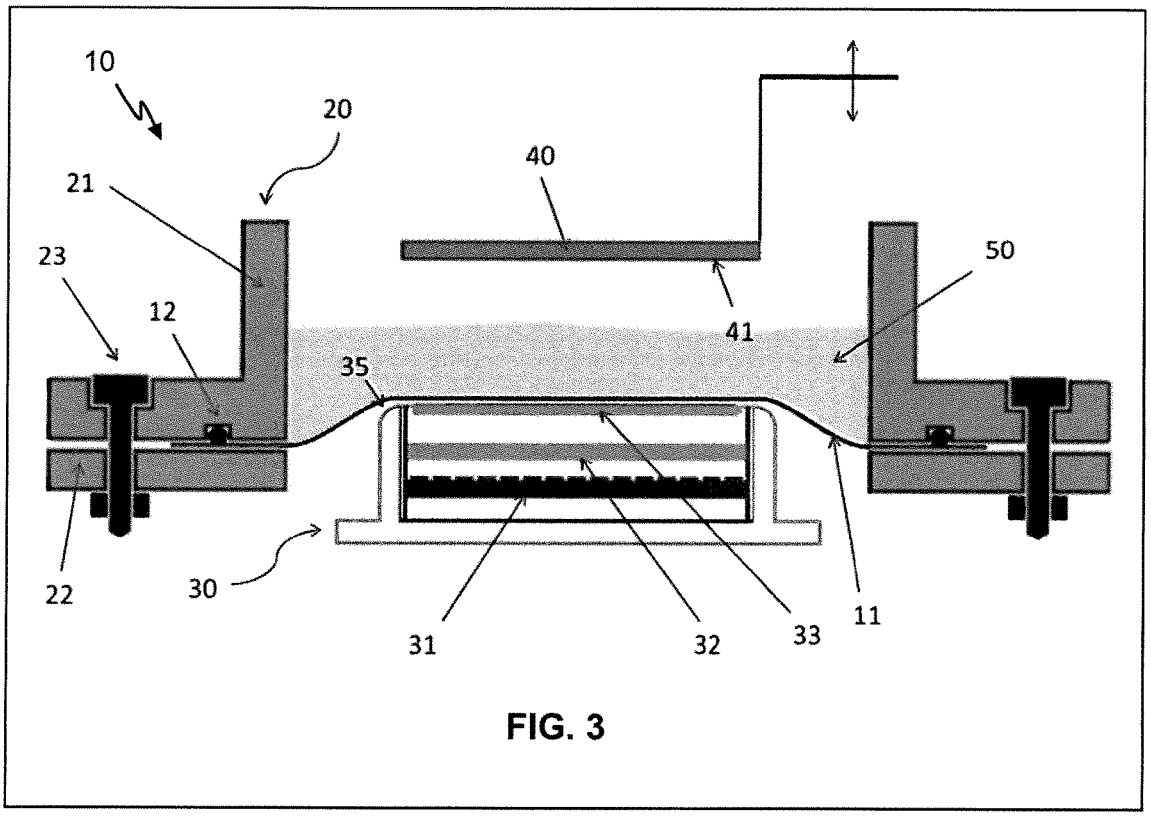

In FIG. 3, the build platform 40 having build surface 41 is shown positioned above a reservoir of polymerisable liquid 50, such as a polymerisable resin, which is contained within the vessel 20 and disposed on the membrane 11 which in this configuration is the lower wall of the vessel. The curing unit 30 is positioned such that the membrane 11 is supported by the rigid curing panel 33 on the side of the membrane that is not in contact with the resin contained in the vessel 20.

To print the first layer of a three dimensional object, the build platform 40 moves to a position such that a thin layer of polymer resin is sandwiched between its build surface 41 and the curing surface (i.e., the surface which faces into the vessel 20) of the membrane 11. The sandwiched layer of resin is of uniform and controlled thickness because the rigid curing panel 33 supports the membrane 11 and may also apply a light tension to it, so that the membrane 11 cannot sag. This means that when the first layer of resin is exposed to radiation of the appropriate wavelength and thus cured, the cured form will not exhibit a convex or dome shape across its surface, but will instead be uniformly flat and level in accordance with the planar surface of the membrane 11.

As shown in FIG. 4, after the photosensitive resin 50 has been exposed to radiation of the appropriate wavelength from the radiation source 31 of the curing unit 30, the exposed region will have solidified to form a solid region 51. This thin layer 51 of cured resin is adhering to both build surface 41 and the curing surface of membrane 11.

After the first layer of resin 50 is cured, the curing unit 30 is moved in a direction away from the membrane 11 (in this instance, the curing unit 30 is lowered) so as to create an air gap 60 between it and the membrane, as shown in FIG. 5.

Figure 7:
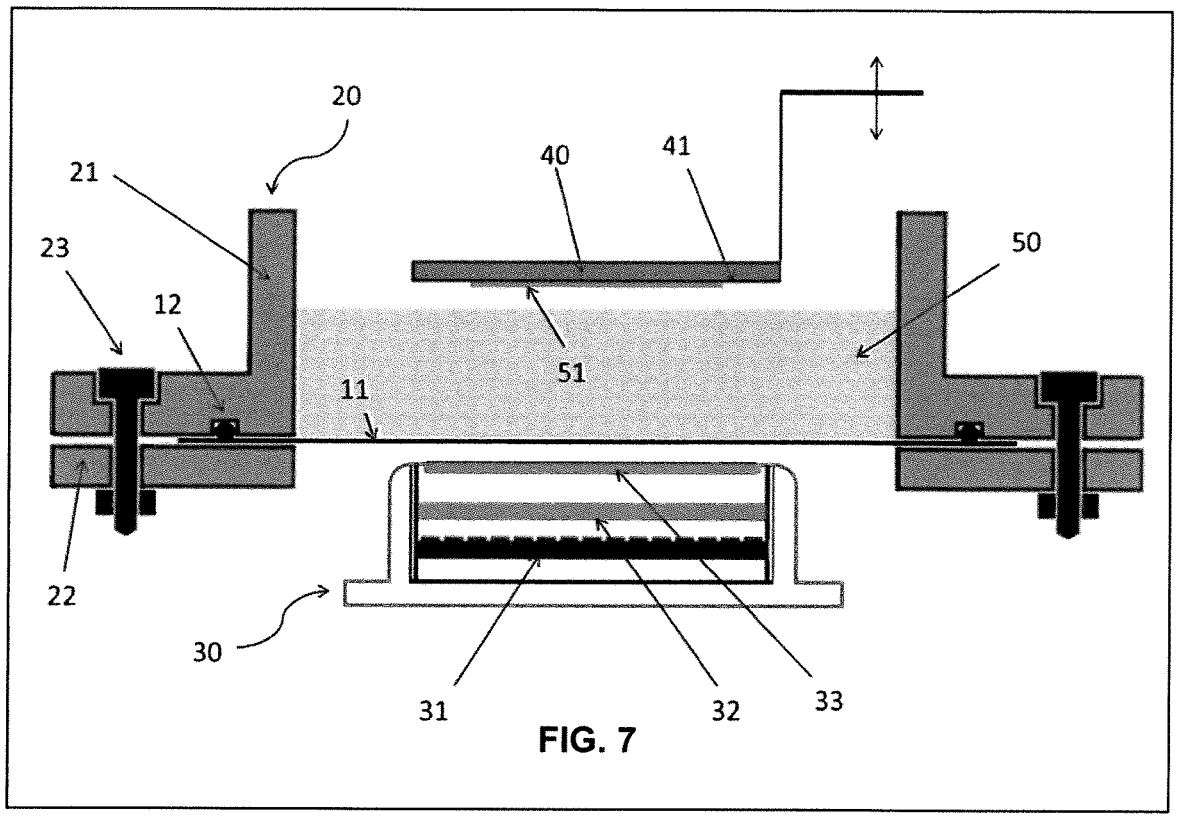

After the air gap 60 has formed, the build platform 40 is made to move in a direction away from the membrane 11 (in the illustrated example, in an upward direction), and in a direction opposing the direction of motion of the curing panel 33 in creating the air gap 60. As shown in FIG. 6, the motion of the build platform 40 tends to pull the recently cured layer 51 of resin away from the membrane 11. The adhesion between the cured layer and the membrane's curing surface is easily overcome as the membrane stretches and/or deforms, gradually and lightly releasing its adhesion by a peeling motion which propagates radially inward, until the centremost part of the cured layer 51 has been released from the curing surface of the membrane 11. Because the membrane 11 is elastic, it will tend to return to its original, substantially planar state once the tensioning force provided by the curing unit 30 is removed, as shown in FIG. 7.

Figure 8:
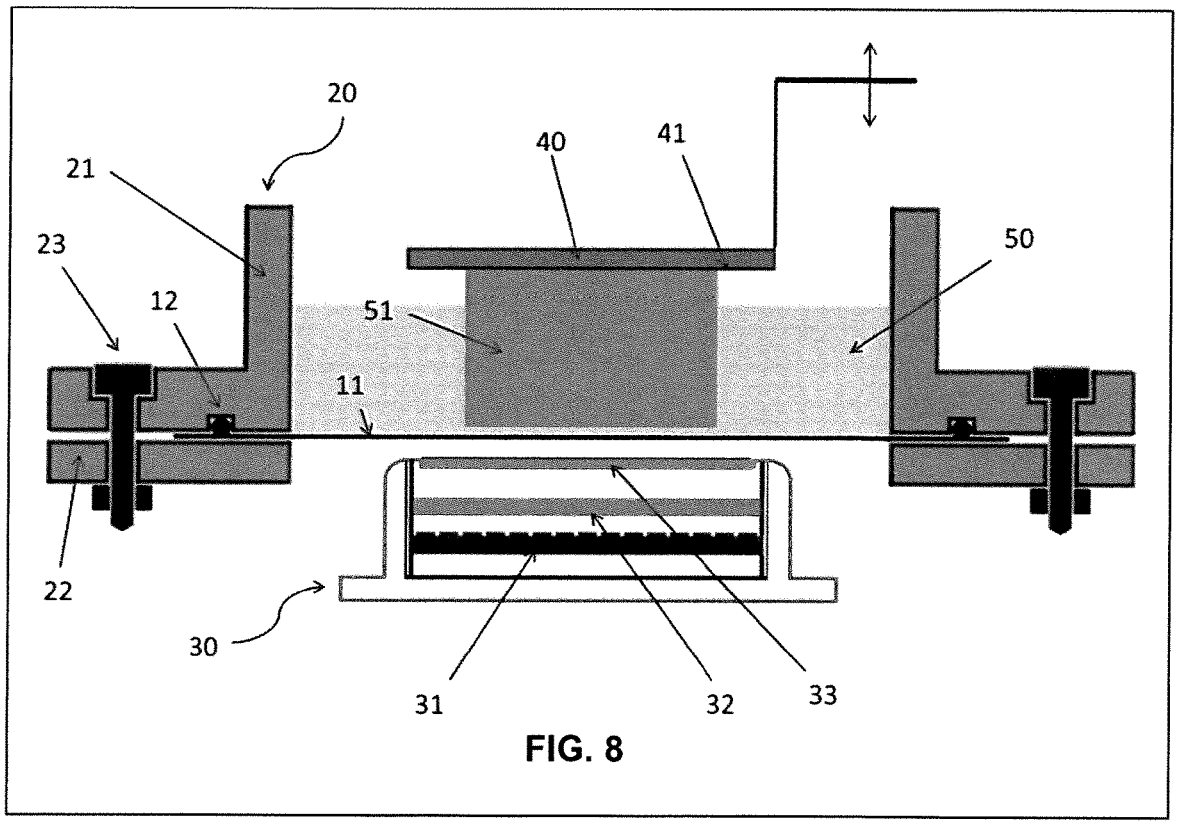

After the cured layer 51 has completely separated from the curing surface of the membrane 11, the curing panel 33 is made to move back to its original position, with contact surface 34 in contact with the membrane 11 (FIG. 3). Either simultaneously with this movement or subsequently, the build platform 40 is moved to a position for the curing of the subsequent layer (not illustrated), i.e. the build platform 40 is made to move towards the membrane 11 such that a new thin layer of resin is sandwiched between the curing surface of the membrane 11 and the face of the most recently cured layer 51 which was previously in direct contact with the curing surface of the membrane 11. Layers are added iteratively by the sequence of steps outlined above until the full desired object has been built, as shown in FIG. 8.

An alternative embodiment of an additive manufacturing device 10', and its configuration during steps of a build operation, is shown schematically in FIGS. 11 to 16. In this alternative embodiment, the build surface 41 of the build platform 40 is upwardly-facing, i.e., facing out of the vessel 20, and the object is built in top-down (i.e., with the build platform starting at the top of the vessel and progressively moving down) rather than bottom-up fashion. This type of build may be preferred when scaling to industrial capacity, since in industrial 3D printing using a bottom-up configuration (such as shown in FIG. 1) the size of the largest printable object may be such that its self-weight would overcome the adhesion forces holding it to the build surface, causing it to fall off the build platform 40 prior to completion. Even partial release of the printed object may cause defects and render a print job wasted.

Figure 11:
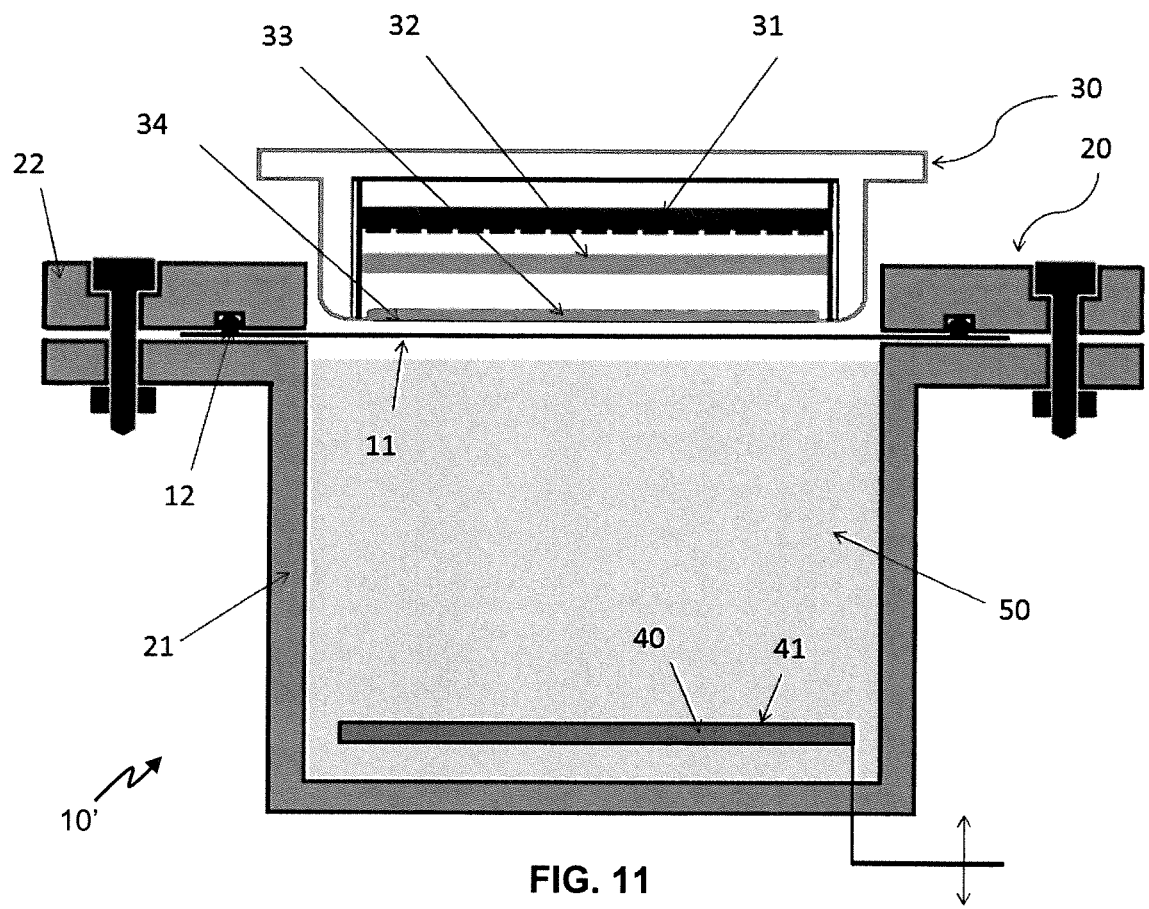
FIG. 11 shows a second embodiment of an additive manufacturing device.

In the device 10' of FIG. 11, a vessel 20 has lower 21 and upper 22 portions between which a flexible membrane 11 is secured. In this embodiment the flexible membrane 11 is the upper wall of the vessel 20. The flexible membrane 11 may be substantially the same as the membrane 11 of the embodiment shown in FIGS. 1 to 8. Although the device 10' comprises a gasket 12 disposed in the upper portions 22 in order to seal the membrane 11 against the vessel 20, this may be omitted in some embodiments since the level of resin 50 in the vessel 20 may be maintained below the level of the membrane 11 such that leakage of resin cannot occur.

Figure 9:
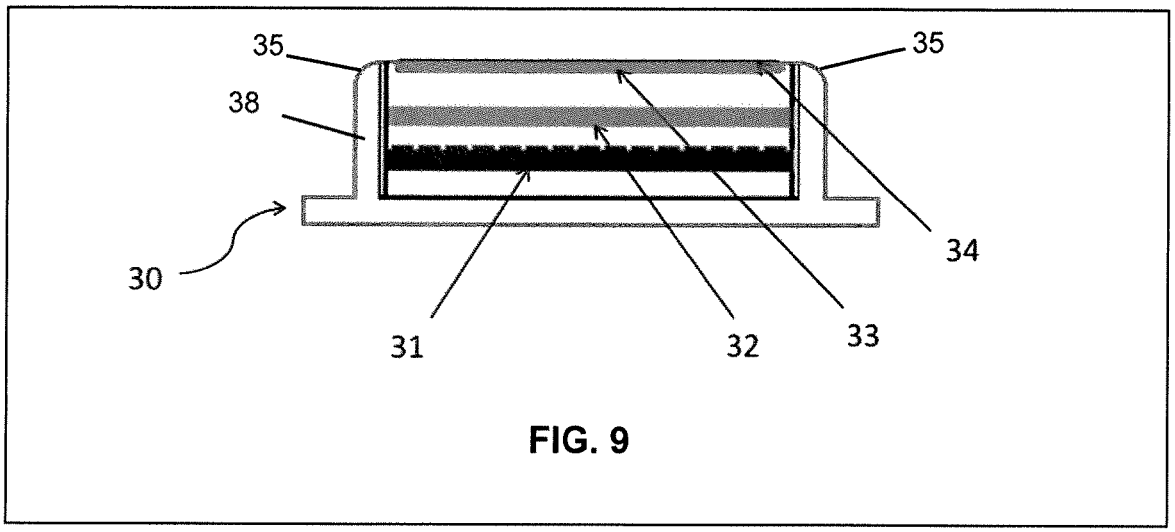
FIG. 9 shows a curing unit of the additive manufacturing device of FIG. 1.

The curing unit 30 of the additive manufacturing device 10 may be substantially as shown in FIG. 9 or FIG. 10, but is in an inverted orientation compared to the embodiment of FIGS. 1 to 8 such that the contact surface 34 of the curing panel 33 faces towards the membrane 11, which in this instance is the upper wall of the vessel 20. Similarly, the build platform 40 may be substantially the same as that of the device shown in FIGS. 1 to 8, such that it can move towards (i.e., upwardly) or away from (i.e., downwardly) the membrane 11.

Figure 12:
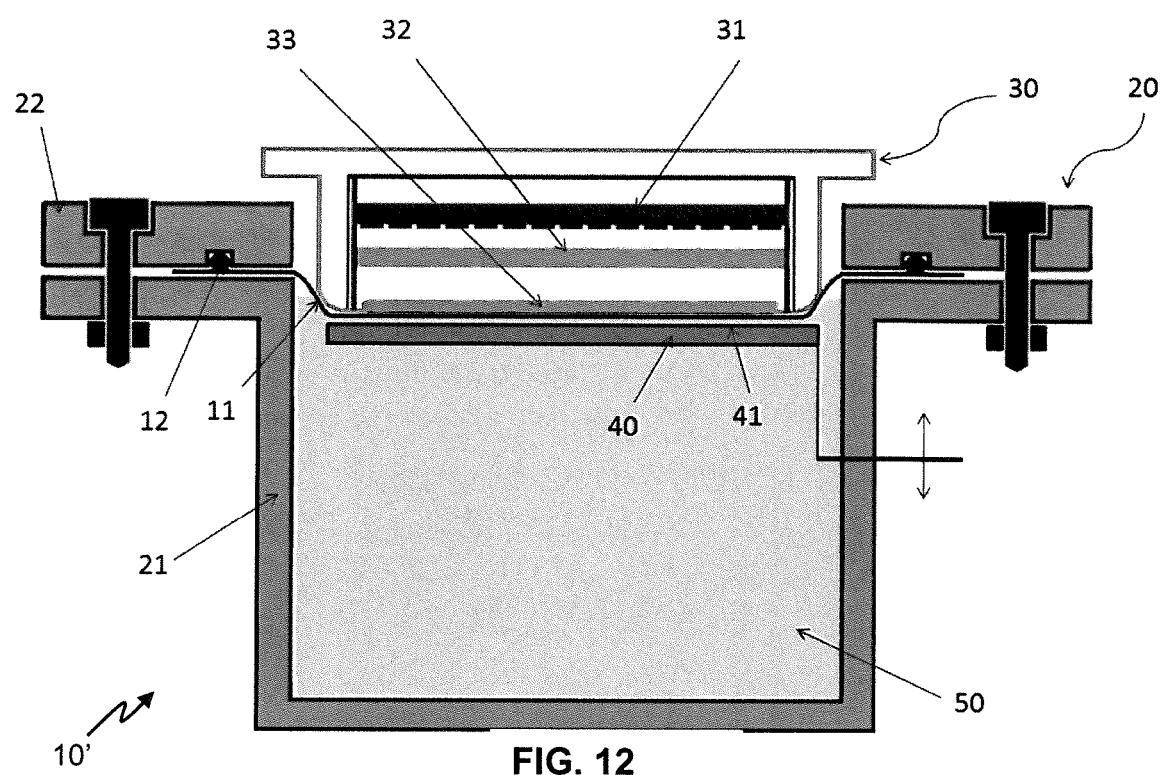
FIGS. 12 to 16 show the additive manufacturing device of FIG. 11 in various states during an additive manufacturing process.

In a printing process implemented by the device 10', the curing unit 30 is moved to a position where it is in contact with the flexible and elastic wall 11 and depresses it so as to provide tension as well as move the inner surface of the wall 11 (i.e., the surface of the wall that faces into the vessel 20) to be in contact with the resin 50, as shown in FIG. 12. The build platform 40 is also moved to a position such that its build surface 41 is a small distance away from the membrane 11. The distance between the build surface 41 and the membrane 11 is equal to the desired thickness of the first layer to be printed.

To ensure that the flexible wall 11 contacts the resin, the vessel 20 has a liquid level sensor (not shown) which can be used to ensure that the liquid level is always at a given desired height. The sensor may provide data to a control system 200, described later, which may actuate a pump which can top up resin 50 into the vessel 20 to the desired height. The curing unit 30 may be configured to move to the same position during curing of each layer such that it depresses the membrane 11 sufficiently to be below the desired height. In this way, the resin level is always maintained slightly above the level where the curing surface will be when curing unit 30 has depressed it into its fixed position for curing.

Figure 13:
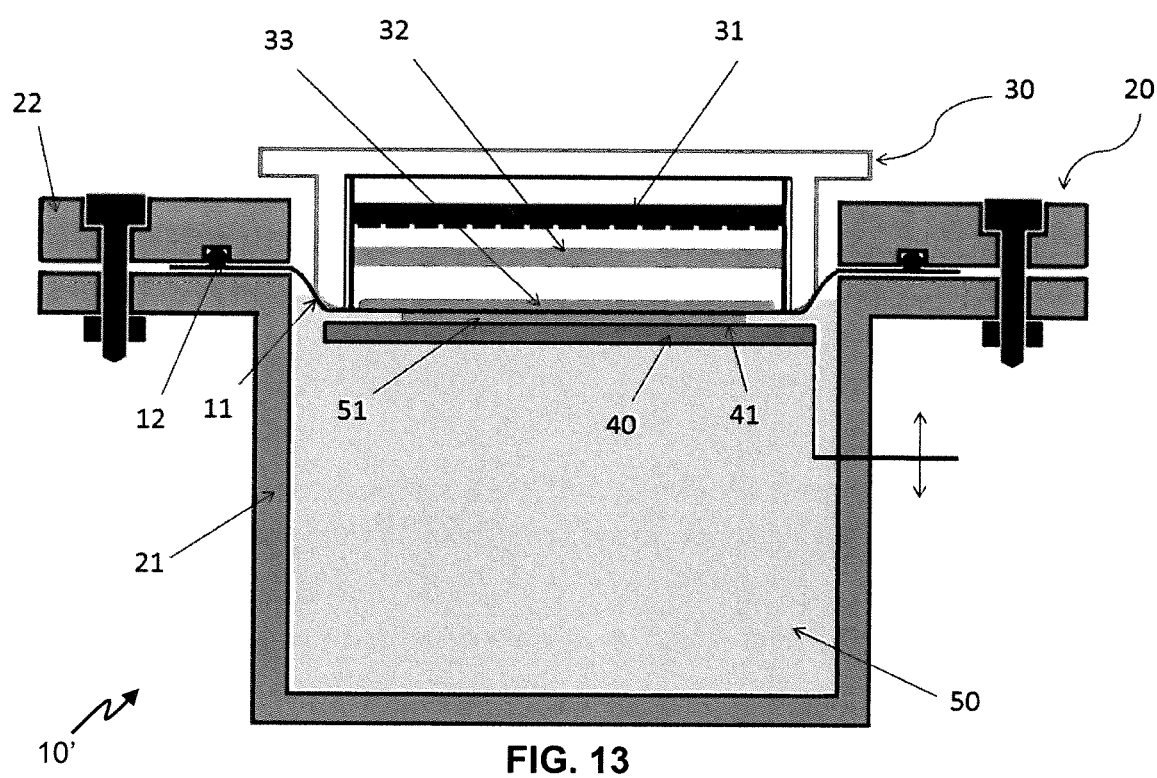

When the curing unit 30 is switched on, the radiation source 31 emits radiation of the appropriate curing wavelength (i.e., suitable for the particular resin 50 in the vessel 20). The radiation is directed towards desired regions of the thin layer of resin in contact with membrane 11 by LCD 32 and through rigid transparent layer 33. The radiation strikes the thin layer of resin sandwiched between the membrane 11 and the build surface 41, resulting in curing of the desired regions, forming a cured resin layer 51 as shown in FIG. 13.

Figure 14:
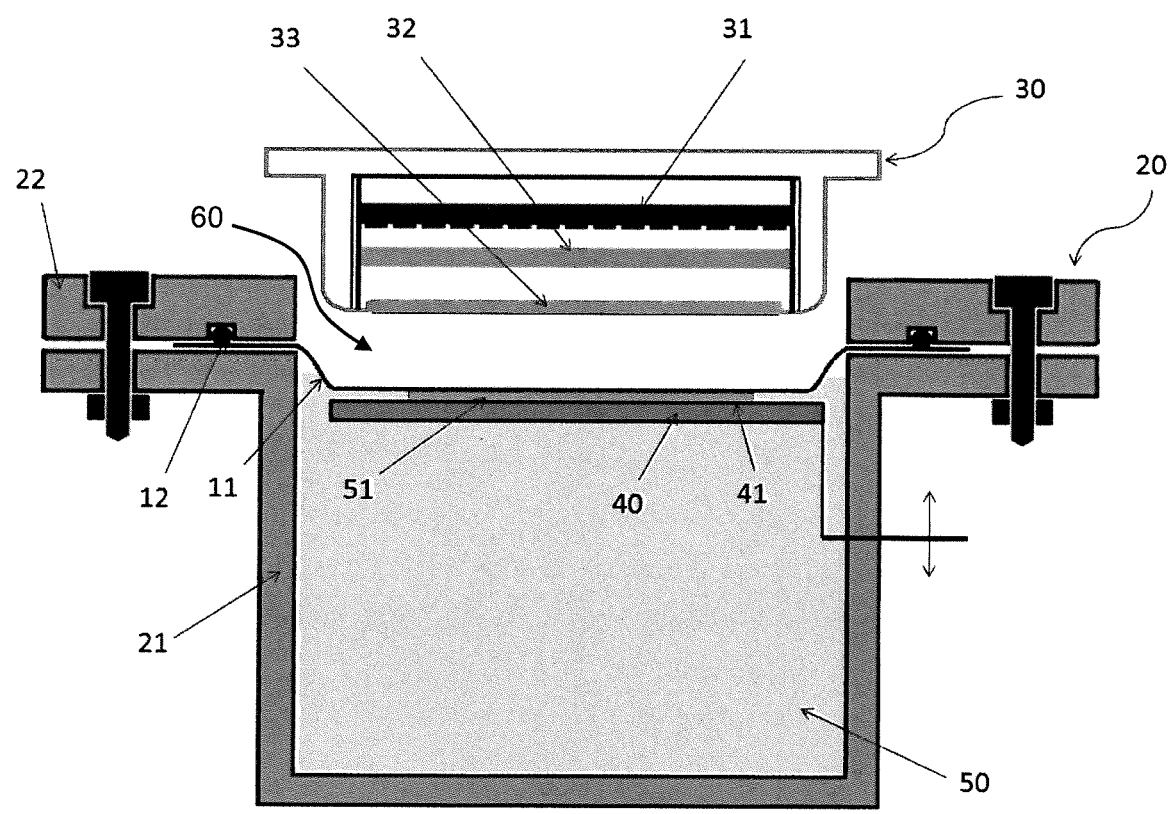

After the curing process is completed, the curing unit 30 may be moved to a position such that it is not in contact with membrane 11, creating an air gap 60 between the outer surface of rigid transparent layer 33 and membrane 11, as shown in FIG. 14.

Figure 15:
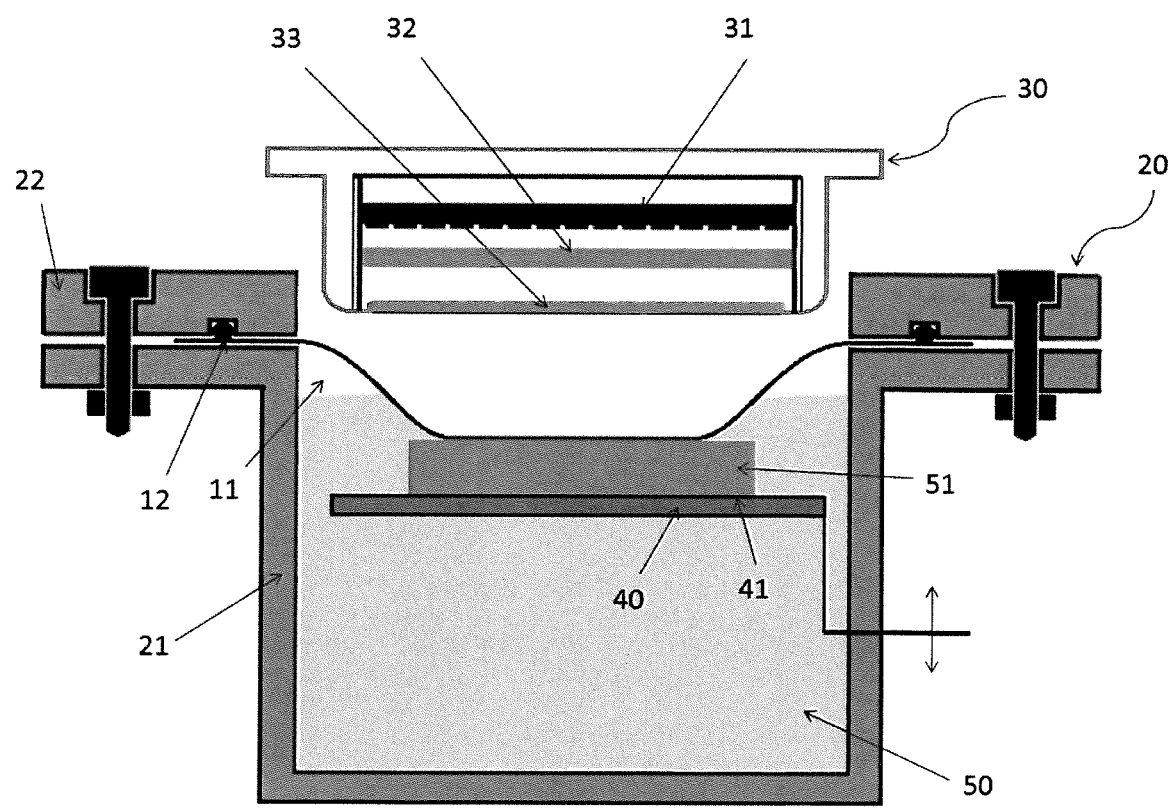

After the air gap 60 has been created, build platform 40 is moved in a direction away from the curing unit 30 (in this case, downward into the vessel 20), and away from the membrane 11, such that the flexible and elastic wall or membrane 11 is stretched along with the build platform 40, causing a propagating peeling release of adhesion between it and the printed object 51 as shown in FIG. 15, in which a multi-layered object 51 is depicted after a large number of layers has already been printed.

Figure 16:
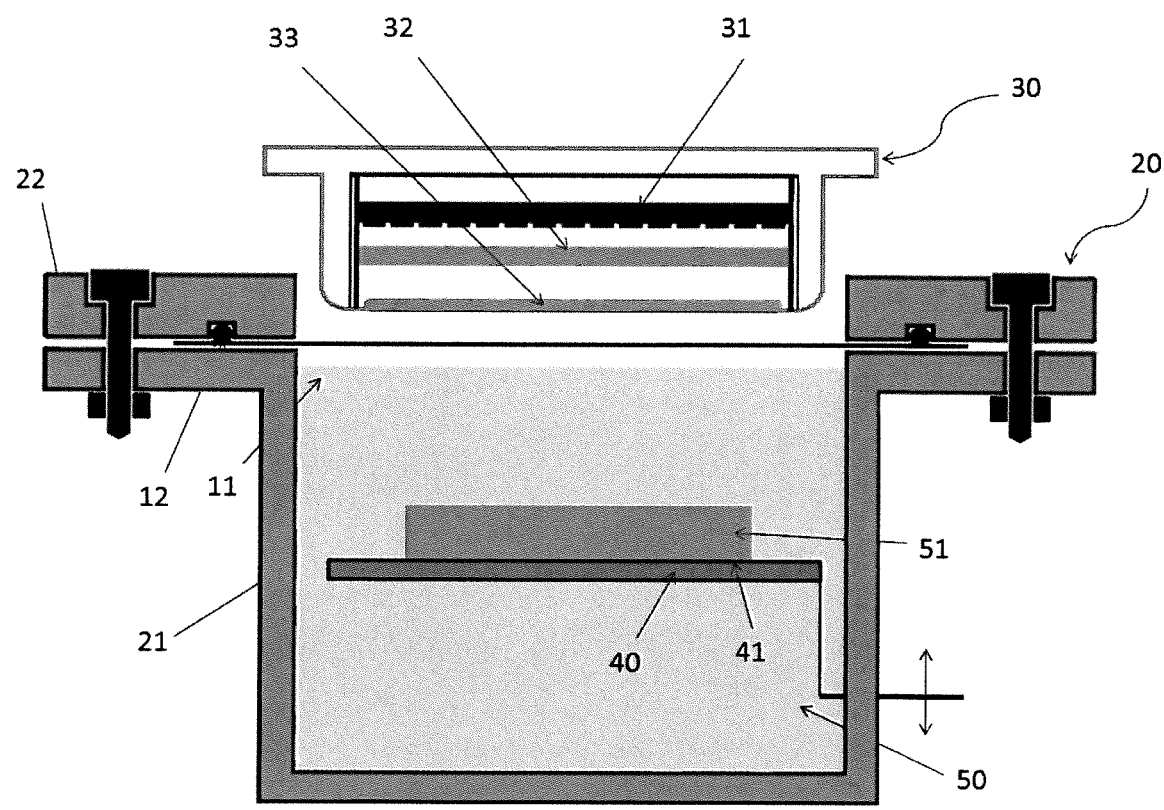

When the outermost surface of printed object 51 has completely released from membrane 11, the elasticity of the membrane 11 causes it to return to its initial position, as shown in FIG. 16. When the build platform 40 moves back to a position such that a thin layer of resin separates the outermost surface of the most recently cured layer from the surface of membrane 11, the process may begin again (as shown in diagram 12) to print the subsequent layer.

Each of the additive manufacturing devices 10, 10' may be operated according to instructions issued by a control system, which activates components such as drive mechanisms of the moving parts of the devices, radiation source 31, dynamic mask 32, etc. in a predetermined sequence in order to carry out a 3D printing operation. The control system may receive input from various sensors including position sensors, liquid level sensors and the like.

In some embodiments, the additive manufacturing device 10, 10' may comprise a mechanism for reducing the presence of air bubbles between the membrane 11 and the contact surface 34 of the rigid component 33. Such bubbles would cause the flexible membrane 11 to have an uneven surface, thus creating defects in the cured layer of resin 51.

For example, the additive manufacturing device 10 or 10' may comprise a conductive drum, plate or other conductive member which can carry an electrostatic charge, and which can be contacted with the flexible membrane 11 to induce an electrostatic charge on the surface of the membrane. An electrostatic charge of the opposite sign may then be induced on the contact surface 34 (for example, using the same conductive member suitably reconfigured to induce the opposite charge, or using another conductive member configured to do so) such that the two surfaces will attract and adhere to one another.

In another example, the device 10, 10' may comprise an air-tight enclosure within which the curing unit 30 and membrane 11 are contained, and a pump which may be actuated to evacuate the enclosure. When the air pressure inside the enclosure is reduced or a vacuum is created inside the enclosure, the flexible membrane 11 will deflect so as to wrap tightly over the contact surface 34, while also drawing out any air bubbles which may otherwise have been contained between the membrane and the contact surface.

An example of a control system 200 of the additive manufacturing devices 10 and 10' described above is shown in FIG. 17. The control system 200 may include a computer system 201 comprising standard computer components, including non-volatile storage (such as a hard disk or solid-state disk) 204, random access memory (RAM) 206, at least one processor 208, and external interfaces 210, 212, 214, 218, all interconnected by a bus 216. The external interfaces include universal serial bus (USB) interfaces 210, and a network interface connector (NIC) 212 which connects the system 201 to a communications network 220 such as the Internet, via which a user computer system 240 may communicate with the control system 200 to allow the user to interact with the device 100. The user computer system 240 may be a standard desktop or laptop computer system, such as an Intel IA-32 based computer system, or a mobile computing device such as a smartphone or tablet computer. The control system 200 can receive input data via NIC 212 or from a storage device connected to one of the USB interfaces 210, or to an alternative interface such as a secure digital (SD) interface (not shown).

In some embodiments, the user may interact directly with the computer system 201, by means of a display, keyboard and mouse or other input/output devices connected via one of the interfaces 210, and an additional display adapter (not shown). In alternative embodiments the computer system may comprise a touchscreen input/output device connected to bus 216, for example by a display adapter (not shown). In these embodiments, the user computer system 240 may be unnecessary. A 3D model file may be loaded onto the computer system 201 by the network connection 220 or SD card or USB storage connected via external interface(s) 210 and the user can then control the slicing process directly on the additive manufacturing device via e.g. the touch screen interface of computer system 201.

The computer system 201 also includes a display adapter 214, which is used to communicate with the LCD 32. The display adapter 214 may be a high-definition multimedia interface (HDMI), video graphics array (VGA) or digital visual interface (DVI), for example. In some embodiments the display adapter 214 may be used to communicate with a projector 36 (FIG. 10).

The storage medium 204 may have stored thereon a number of standard software modules, including an operating system 224 such as Linux or Microsoft Windows, and one or more modules 202 comprising instructions for causing the at least one processor 208 to carry out various operations, including receiving input data relating to a 3D model (representing the object to be built) via USB interface(s) 210 and/or network interface 212; processing the input data to generate a sequence of layer patterns; and successively transmitting the layer patterns to LCD 32 (or alternatively, another type of dynamic mask generator or an LED or OLED display) via display adapter 214, and signaling a microcontroller 270 to actuate mechanical, electrical and/or optical components of the additive manufacturing device. In some embodiments, the 3D model data may be provided in STL, STEP or another 3D vector file format, and stored on storage medium 204 for processing by module(s) 202. In other embodiments the input 3D model data may be received layer-by-layer from user computing system 240 or elsewhere via communications network 220 and stored either in RAM 206 or on storage medium 204 for processing by module(s) 202.

Processes executed by the system 201 are implemented in the form of programming instructions of one or more software modules or components 202 stored on the storage medium 204 associated with the computer system 201, as shown in FIG. 17. However, it will be apparent that the processes could alternatively be implemented, either in part or in their entirety, in the form of one or more dedicated hardware components, such as application-specific integrated circuits (ASICs), and/or in the form of configuration data for configurable hardware components such as field programmable gate arrays (FPGAs), for example.

Figure 18:
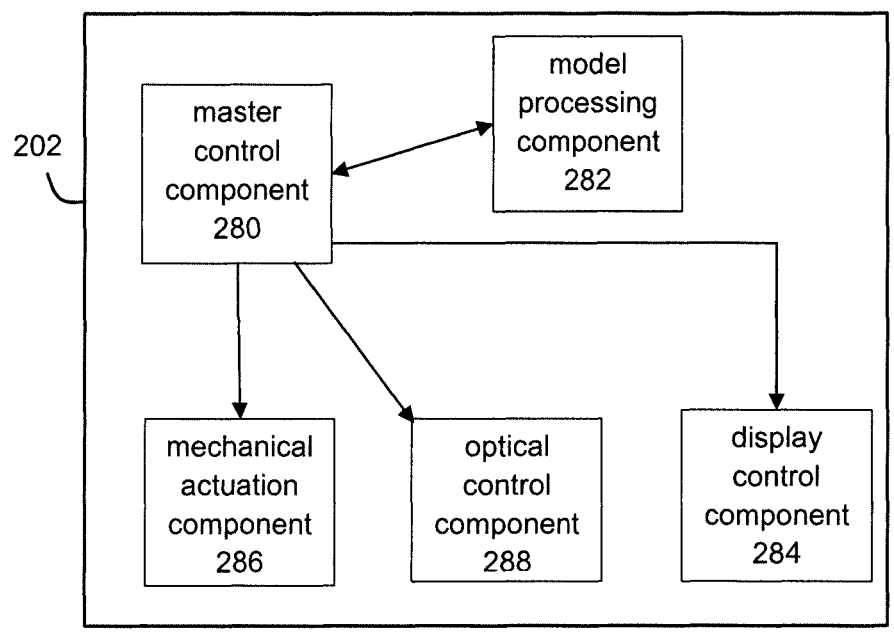
FIG. 18 is a block diagram of software components of the control system of FIG. 17.

In one example, as shown in FIG. 18, the software components 202 comprise a master control component 280, which coordinates the overall flow of an additive manufacturing process which is under the control of control system 200. The master control component 280 is in communication with a mechanical actuation component 286 which generates control signals to drive, via microcontroller 270, mechanical components of the additive manufacturing device, such as pumps and motors. Master control component 280 is also in communication with optical control component 288 which generates control signals to (via microcontroller 270) turn the radiation source 31 of curing unit 30 on or off, and to control the duration and intensity of irradiation.

Master control component 280 may accept user input data, such as the 3D model data, and build parameters such as the positioning and orientation of the object with respect to the build surface, arrangement of multiple objects in the same batch print, and the desired print layer thickness (which determines how many slices need to be generated, etc.). The input data can then be passed to model processing component 282, which "slices" the 3D model data in accordance with the build parameters to generate a sequence of two-dimensional image files, which can be stored on storage medium 204 for example. The model processing component may comprise any known slicing software module, such as GnexLab, EnvisionLabs Creation Workshop, Slic3r or FreeSteel. Once the slicing operation has been performed by model processing component 282, the output slices are passed by master control component 280 to display control component 284, which is configured to send control signals to LCD 32 to turn individual pixels of pixel array 256 on or off in accordance with the pattern corresponding to an image slice transmitted by the display control component 284.

During a printing operation, the slices (image files) are transmitted by display control component 284 (through the display adapter 214) to a scalar board 252 of the LCD 32. A scalar board is a standard and widely used method of interfacing with displays. Typically, scalar boards are embedded as part of the electronics assembly inside commercially available LCD monitors or televisions. The scalar board 252 translates an image or video file from digital signal (HDMI or DVI) or analogue signal (VGA) into low voltage differential signals (LVDS) which are interpretable by an internal control board 254 of the LCD 32. Internal control board 254 switches pixels of the pixel array 256 on or off in accordance with the input image received from the display control component 284.

During printing, the computer system 201 also interfaces, via a USB or serial interface (such as an RS-232 interface) with a microcontroller 270 which is capable of driving all other actuators of the additive manufacturing device. For example, the microcontroller 270 may drive stepper motors 21, the light source 31 of curing unit 30, one or more pumps (not shown) for pumping additional polymerizable medium 50 into the vessel 20, linear or rotational motion actuators for driving motion of vessel 20 and/or build platform 40 and/or curing unit 30, and so on. Microcontroller 270 may also read input from various sensors, such as a level sensor for polymerizable material in the vessel, a build platform height sensor, lateral sliding travel end-stop sensor(s) for vessel 20 and/or build platform 40 and/or curing unit 30, vertical end-stop sensors, temperature sensors, and so on.

After each layer (slice image file) is sent from the display control component 284 to the scalar board 252 and thus projected on the display 32 for the required curing time (which may be provided as one of the build parameters and/or determined according to the intensity and emission spectrum of the light source, and the nature of the polymerizable medium) the master control component 280 may instruct, with appropriate timing and sequencing, mechanical actuation component 286 and optical control component 288 to send signals to the microcontroller 270 which can interpret them and drive the various motors, pumps and light source in the desired sequence.

Although particular embodiments have been described and illustrated, it will be appreciated by those of ordinary skill in the art that various modifications and combinations of features of the above embodiments are possible without departing from the scope of the invention as defined in the appended claims.

The invention claimed is:

1. An additive manufacturing device, comprising:
a vessel for containing a material which is polymerisable at one or more curing wavelengths, the vessel having a flexible wall which is at least partially transparent to radiation at the one or more curing wavelengths;
a build platform having a build surface, the build platform being movable relative to the vessel to position the build surface such that the build surface faces the flexible wall; and
a curing unit comprising a housing that encloses:
a rigid component that forms a curing panel having a planar contact surface that faces away from the housing, the rigid component being at least partially transparent to radiation at the one or more curing wavelengths; and
a radiation module positioned or positionable relative to the rigid component to emit radiation therethrough, wherein the radiation module comprises a dynamic mask component, and a radiation source for irradiating through the dynamic mask component, wherein the rigid component is separate from the dynamic mask component and the radiation source, wherein the rigid component and the dynamic mask component are fixed relative to each other, and are movable relative to, and independently of, the radiation source, and
wherein the rigid component and the vessel are movable relative to each other, such that in a first position, the planar contact surface of the rigid component is in contact with the flexible wall, and in a second position, the rigid component is separated from the flexible wall.

2. An additive manufacturing device according to claim 1, wherein the dynamic mask component comprises an electronically addressable array of radiation transmitting elements, the array being configurable to produce radiation having a predetermined pattern by selective activation of elements of the array.

3. An additive manufacturing device according to claim 1, wherein the dynamic mask component comprises a liquid crystal display (LCD).

4. An additive manufacturing device according to claim 3, wherein the LCD is a monochrome LCD.

5. An additive manufacturing device according to claim 1, wherein the flexible wall is a membrane.

6. An additive manufacturing device according to claim 5, wherein the membrane comprises at least one of fluoropolymer or an elastomer.

7. An additive manufacturing device according to claim 1, wherein the rigid component is an outer layer of the curing unit.

8. An additive manufacturing device according to claim 7, wherein the rigid component is a transparent or translucent panel.

9. An additive manufacturing device according to claim 1, wherein the housing comprises a rounded edge.

10. An additive manufacturing device according to claim 1, wherein the curing unit is housed in an air-tight enclosure, and wherein the device further comprises a pump for evacuating the air-tight enclosure.

11. An additive manufacturing device, comprising:
a vessel for containing a material which is polymerisable at one or more curing wavelengths, the vessel having a flexible wall which is at least partially transparent to radiation at the one or more curing wavelengths;
a build platform having a build surface, the build platform being movable relative to the vessel to position the build surface such that the build surface faces the flexible wall;
a curing unit comprising a housing that encloses:
a rigid component that forms a curing panel having a planar contact surface that faces away from the housing, the rigid component being at least partially transparent to radiation at the one or more curing wavelengths, wherein the rigid component and the vessel are movable relative to each other, such that in a first position, the planar contact surface of the rigid component is in contact with the flexible wall, and in a second position, the rigid component is separated from the flexible wall; and
a radiation module positioned or positionable relative to the rigid component to emit radiation therethrough, wherein the radiation module comprises a dynamic mask component, and a radiation source for irradiating through the dynamic mask component, and wherein the rigid component is separate from the dynamic mask component and the radiation source; and
a conducting device arranged to be in contact with the flexible wall to induce a first electrostatic charge on a surface of the flexible wall, and to be in contact with the planar contact surface to induce a second electrostatic charge on the planar contact surface, wherein the first electrostatic charge is opposite in sign to the second electrostatic charge.

* * * * *